(12) United States Patent
Rusconi Clerici Beltrami et al.

(10) Patent No.: US 10,728,651 B2
(45) Date of Patent: Jul. 28, 2020

(54) AUDIO SYSTEM HAVING BEAM-SHAPING SPEAKERS AND EYEWEAR HAVING SUCH AN AUDIO SYSTEM

(71) Applicant: USOUND GMBH, Graz (AT)

(72) Inventors: Andrea Rusconi Clerici Beltrami, Vienna (AT); Ferruccio Bottoni, Graz (AT); Alois Sontacchi, Gratwein-Strassengel (AT); Hannes Pomberger, Graz (AT)

(73) Assignee: USOUND GMBH, Graz (AT)

( * ) Notice: Subject to any disclaimer, the term of this patent is extended or adjusted under 35 U.S.C. 154(b) by 0 days.

(21) Appl. No.: 16/079,703

(22) PCT Filed: Feb. 8, 2017

(86) PCT No.: PCT/EP2017/052673
§ 371 (c)(1),
(2) Date: Aug. 24, 2018

(87) PCT Pub. No.: WO2017/144269
PCT Pub. Date: Aug. 31, 2017

(65) Prior Publication Data
US 2019/0052954 A1  Feb. 14, 2019

(30) Foreign Application Priority Data

Feb. 26, 2016  (DE) .......................... 10 2016 103 477

(51) Int. Cl.
*H04R 1/28* (2006.01)
*G10K 11/175* (2006.01)
(Continued)

(52) U.S. Cl.
CPC .......... *H04R 1/2811* (2013.01); *G10K 11/175* (2013.01); *G10K 11/26* (2013.01);
(Continued)

(58) Field of Classification Search
None
See application file for complete search history.

(56) References Cited

U.S. PATENT DOCUMENTS

2005/0248717 A1  11/2005 Howell et al.
2009/0180657 A1  7/2009 Isvan
(Continued)

OTHER PUBLICATIONS

International Search Report (PCT/EP2017/052673), dated May 2, 2017.
(Continued)

*Primary Examiner* — Kenny H Truong
(74) *Attorney, Agent, or Firm* — Dority & Manning, P.A.

(57) ABSTRACT

The invention relates to an audio system (2) for disposing in the external region of an ear, having a carrier element (4) for affixing to the head of the user and comprising at least one hollow space (26, 27, 28) having a primary opening (11, 12, 13) oriented in the direction of an ear opening (22) of the intended ear when the carrier element (4) is disposed as intended, and having at least one speaker (5, 6, 7) disposed in the hollow space (26, 27, 28), the cavity (14, 15, 16) thereof being at least partially formed by a first hollow space region (29) and by means of which first sound waves (35) can be emitted through the primary opening (11, 12, 13) in the direction of the ear spaced apart from said opening. According to the invention, the hollow space (26, 27, 28) comprises a secondary opening (17, 18, 19) disposed in the first hollow space region (29) such that said opening is oriented away from the ear toward the surrounding area when the carrier element (4) is disposed as intended so that second sound waves (36) can be emitted through the secondary opening (17, 18, 19) by means of the speaker (5, 6, 7), said waves being offset in phase from the first sound waves (35) such that the volume of the sound waves emitted
(Continued)

by the audio system (2) into the surrounding area can be reduced.

17 Claims, 2 Drawing Sheets

(51) Int. Cl.
  *H04R 1/10*   (2006.01)
  *H04R 5/02*   (2006.01)
  *G10K 11/26*   (2006.01)
  *H04R 1/02*   (2006.01)
  *H04R 1/34*   (2006.01)

(52) U.S. Cl.
  CPC ............ *H04R 1/1008* (2013.01); *H04R 5/02* (2013.01); *G10K 2210/1081* (2013.01); *G10K 2210/3219* (2013.01); *H04R 1/028* (2013.01); *H04R 1/347* (2013.01)

(56) References Cited

U.S. PATENT DOCUMENTS

| | | |
|---|---|---|
| 2010/0080400 A1 | 4/2010 | Sibbald et al. |
| 2012/0020480 A1* | 1/2012 | Visser ............... H04R 3/12 |
| | | 381/17 |
| 2013/0308786 A1 | 11/2013 | Sibbald et al. |
| 2014/0268016 A1 | 9/2014 | Chow et al. |
| 2014/0270316 A1 | 9/2014 | Fan |
| 2015/0208160 A1* | 7/2015 | Chu ............... H04R 1/1058 |
| | | 381/373 |
| 2016/0198249 A1* | 7/2016 | Pan ............... H04R 1/1041 |
| | | 381/74 |

OTHER PUBLICATIONS

German Search Report (102016103477.0) dated Nov. 21, 2016.
Translation of IPRP (PCT/EP2017/052673), dated Sep. 7, 2018.

* cited by examiner

AUDIO SYSTEM HAVING BEAM-SHAPING SPEAKERS AND EYEWEAR HAVING SUCH AN AUDIO SYSTEM

CROSS-REFERENCE TO RELATED APPLICATIONS

This application claims priority to International Application Serial No. PCT/EP2017/052673, filed Feb. 8, 2017, which claims priority to German Application No. 10 2016 103 477.0, filed Feb. 26, 2016. International Application Serial No. PCT/EP2017/052673 is hereby incorporated herein in its entirety for all purposes by this reference.

FIELD OF THE INVENTION

The invention relates to an audio system with a speaker carried by eyewear in a hollow space near the ear when being worn. The present invention further relates to eyewear, particularly data glasses, with such an audio system.

BACKGROUND OF THE INVENTION

Eyewear comprising a speaker and an acoustic sound guide element is disclosed by U.S. 2014/0270316 A1, which is hereby incorporated herein by this reference for all purposes. The sound produced by the speaker can be guided to the ear opening of a user, so that the user can perceive said audio information. The sound guide element here extends from the earpiece of the eyewear into the ear opening of the user. A disadvantage in this case is that the direct arrangement of the sound guide element at the ear opening causes ambient sounds to be dampened. In addition, the user finds it disturbing if the audio system is disposed directly at the ear opening or in the ear opening.

BRIEF OBJECTS AND SUMMARY OF THE INVENTION

The object of the present invention is thus to produce an audio system for disposing in the external region of an ear, by means of which audio information can be transmitted to a user without said information being perceivable by persons present in the surrounding area, such that relevant ambient sounds are not damped and/or the wearing comfort can be increased.

The object is achieved by an audio system for disposing in an external region of an ear and by eyewear for inputting and outputting visual and/or auditory information and having the features described below.

The invention relates to an audio system for disposing in the external region of an ear. When the audio system is disposed as intended, said system is spaced apart from the ear, particularly from the ear opening. The audio system comprises a carrier element for affixing to the head of the user and comprising at least one hollow space having a primary opening. The primary opening is disposed on the carrier element such that said opening is oriented in the direction toward the ear opening of the intended ear when the carrier element is disposed as intended. The primary opening is accordingly preferably spaced apart from the intended ear and/or is thus preferably present to the side of the ear and/or is aligned in the direction of the ear opening. The audio system further comprises at least one speaker disposed in a hollow space. Said speaker is preferably a MEMS speaker. The cavity of the speaker is formed at least partially by a first hollow space region of the hollow space.

First sound waves can be emitted by means of the speaker through the primary opening in the direction of the ear spaced apart from said opening.

In order to enable acoustic beam shaping or "beam forming"—wherein the audio signals emitted into the surrounding area are reduced to a minimum and/or are focused substantially on the ear opening of the user—the hollow space comprises a secondary opening disposed in the first hollow space region such that said opening is oriented away from the ear toward the surrounding area when the carrier element is disposed as intended. Second sound waves offset in phase from the first sound waves can thereby be emitted by means of the speaker through the secondary opening. The phase offset is here implemented such that the volume of the sound waves emitted into the surrounding area by the audio system can be reduced. Auditory information can thus be advantageously transmitted by the audio system to the user without said information being able to be perceived by persons present nearby. The non-contacting implementation of the audio system, that is, spaced apart from the ear, and the associated high level of wearing comfort can also achieve a very high level of customer acceptance. The user accordingly does not need to wear a disturbing element in the immediate vicinity of the ear opening, because the audio signals are transmitted in a focused manner from a region spaced apart from the ear to the ear opening.

It is advantageous if the primary opening and the secondary opening are disposed at two different sides and/or sides of the carrier element facing away from each other. One of said two sides is here oriented in the direction of the intended ear opening and the other side is oriented away from the ear opening and toward the surrounding area. In order to be able to eliminate through the secondary opening the sound waves also emitted partially to the surrounding area through the primary opening, it is advantageous if the primary opening and the secondary opening are oriented in directions rotated at least 90° and no more than 180° from each other. It is thereby ensured that the secondary opening is directed far enough away from the ear opening that only the sound waves emitted into the surround area are thereby eliminated.

It is advantageous if the opening surface area of the secondary opening is slightly smaller or equal in size to the opening surface area of the primary opening.

It is further advantageous if the audio system comprises a control unit electrically connected to the speaker for acoustic beam shaping. Said control unit is preferably integrated in the carrier element. It can thereby be ensured that the speaker is actuated such that the relevant audio information is made available exclusively to the user, and that persons present in the surrounding area do not hear anything.

In an advantageous refinement of the invention, the control unit is implemented such that the first sound waves emitted by the at least one speaker through the primary opening can be focused in the region of the ear opening. The sound waves inadvertently emitted to the surrounding area can thereby be reduced. In addition or alternatively, it is further advantageous if the control unit is implemented such that the second sound waves comprise a phase offset of substantially 180°. The first sound waves inadvertently emitted into the surrounding area through the primary opening can be eliminated by the second sound waves offset 180° through the secondary opening. Persons present in the surrounding area can thus not perceive the audio information associated with the user.

In order to have greater freedom in the arrangement of the speaker, it is advantageous if the speaker comprises a sound guide channel leading to the primary opening. Said channel is preferably formed at least partially by a second hollow space region of the hollow space. The first sound waves produced by the speaker are accordingly guided through the sound guide channel to the primary opening.

To simplify manufacturing and subsequent replacement of the audio system, it is advantageous if the carrier element comprises two housing parts joined together, between which the hollow space is implemented. The housing parts can be releasably or permanently joined to each other. The first and/or second hollow space region is preferably partially implemented in the first and second parts of the housing. The housing parts in this case thus both comprise a recess curved concavely toward the inside and forming the hollow space when assembled.

For easier assembly of the audio system, it is advantageous if the speaker is disposed and/or braced between the two parts of the housing. To this end, at least one of the two parts of the housing preferably comprises a mounting recess in which the speaker is positively held. In this case the speaker particularly contacts the mounting recess at the side and/or at the edge region of one of the two end faces thereof.

In an advantageous refinement of the invention, the two hollow space regions are separated from each other by the speaker disposed between said regions and/or by means of a sealing element. It can thereby be avoided that first sound waves emitted into the first hollow space region can penetrate into the second hollow space region. In the same way, the sealing element also prevents the second sound waves emitted by the speaker into the second hollow space region from penetrating into the first hollow space region. Very high audio quality can thereby be ensured.

In order to ensure complete sealing, it is advantageous if the sealing element is implemented as a frame and/or is pressed between the speaker, particularly on the end face thereof facing away from the mounting recess, and one of the two housing parts.

For a compact design of the audio system it is advantageous if the speaker is an MEMS speaker. Said speaker is preferably a piezoelectric MEMS speaker. Said speaker comprises a membrane and a piezoelectric actuator layer or actuator. The membrane of the MEMS speaker can be spaced apart from the actuator or the actuator layer and/or can be coupled by means of a stroke structure disposed between the two.

The speaker advantageously comprises a membrane displaceable along a stroke axis, wherein the primary opening and/or secondary opening is preferably aligned at an angle, particularly angled substantially at 90°, to the stroke axis. A very compact design of the audio system can thereby be implemented.

It is advantageous if the audio system comprises at least one bass speaker and/or at least two treble speakers. For beam shaping, it is advantageous if the primary openings of the two treble speakers are spaced apart from each other, particularly between 1 cm and 5 cm, particularly preferably 2 cm. It is further advantageous in this respect if the control unit is implemented for acoustic beam shaping such that the two treble speakers can be actuated at a phase offset depending on the distance. The first sound waves emitted to the surrounding area can thereby be focused on the ear opening and the sound waves emitted to the surrounding area can be reduced. It is advantageous if the treble speakers do not have a secondary opening.

It is further advantageous if the bass speaker is disposed between the two treble speakers. The audio system can thereby be implemented in a very space-saving manner.

Furthermore, the distance between the two treble speakers can be increased, in turn having an advantageous effect on beam shaping. Alternatively, however, it is also advantageous if the bass speaker is disposed at the edge region of the speaker array, because the cavity thereof can thus be enlarged on the side facing away from the adjacent speaker.

In order to be able to optimally dispose the speakers of the audio system in a region following the ear contour, it is advantageous if the primary openings of the speakers are disposed on a curved outer surface of the carrier element. It can thereby be advantageously ensured that all primary openings are substantially spaced equally apart from the ear opening when the carrier element is disposed as intended. The quality of the acoustic beam shaping can thus be advantageously optimized.

It is further advantageous if the audio system comprises a microphone, particularly an MEMS microphone, and/or the control unit is implemented such that the background noise captured by the microphone can be suppressed by correspondingly actuating at least one speaker.

It is advantageous if the carrier element is integrated in an eyewear earpiece of an eyewear. Alternatively, the carrier element can, however, also be implemented as an eyewear earpiece. In this case the primary openings of the speakers are preferably disposed in the region of a bottom side and the secondary openings in the region of a side surface and/or top side of the eyewear earpiece. The primary openings disposed on the bottom side can thus be aligned to the ear opening, particularly if the bottom side has a curved design, whereas the secondary openings of the speakers are simultaneously oriented away from the same and into the surrounding area.

An eyewear, particularly data glasses, for inputting and outputting visual and/or auditory information is further proposed. The eyewear comprises an audio system. The audio system is implemented according to the preceding description, wherein the features indicated can be present individually or in any arbitrary combination. An eyewear having an audio system and characterized by very high wearing comfort can thus be produced, because no components of the audio system need to be disposed in the immediate vicinity of the ear opening or even in the ear opening itself. Instead, the audio system can be worn in a non-contacting manner, that is, completely spaced apart from the ear opening. Furthermore, audio information can be made available exclusively to the user by means of said eyewear, without persons present in the surrounding area being able to hear as well.

BRIEF DESCRIPTION OF THE DRAWINGS

Further advantages of the invention are described in the embodiment examples below. Shown are.

DETAILED DESCRIPTION

Figure 1:
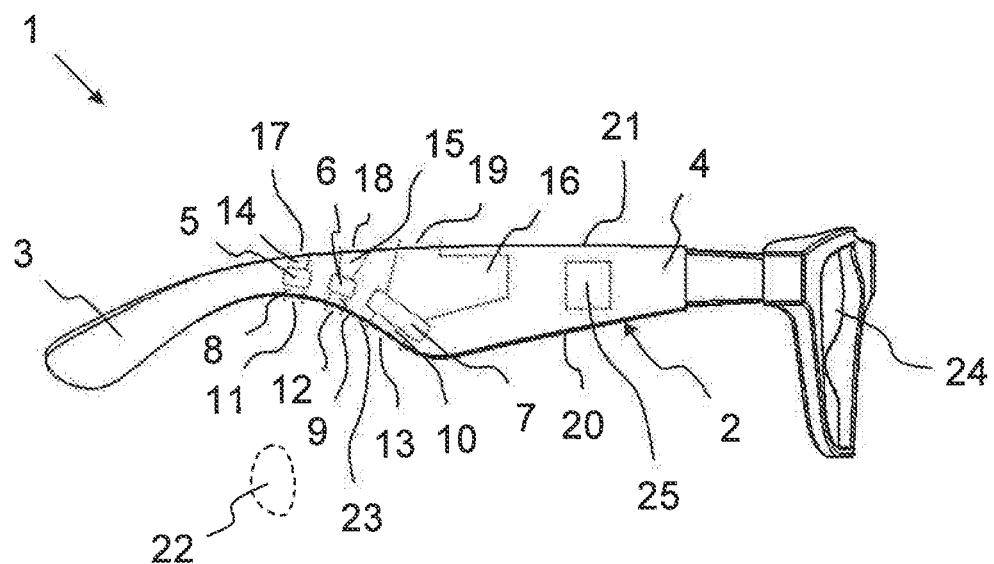
FIG. 1 A side view of eyewear having a schematically shown audio system integrated in an eyewear earpiece, FIG. 2 A perspective rear view of an eyewear earpiece having a plurality of primary openings disposed on the bottom side and secondary openings disposed on the top side, FIG. 3 A longitudinal section through an eyewear earpiece, and FIG. 4 A cross section through an eyewear earpiece in the region of a speaker of the audio system.

FIG. 1 shows eyewear 1 having an integrated audio system 2. The eyewear 1 is implemented as data glasses, by means of which visual information, particularly AR information (Augmented Reality), can be displayed to the user. Said eyewear comprises a memory unit not shown here and an interface by means of which the eyewear 1 can communicate with other systems, particularly wirelessly.

The eyewear 1 can also communicate audio information to the user thereof through the audio system 2. According to the present embodiment example, the audio system 2 is integrated in an eyewear earpiece 3 of the eyewear 1. Alternatively, however, it is also conceivable that at least parts of the audio system 2 are releasably mounted on the eyewear 1. The audio system 2 comprises a carrier element 4 in which the further components of the audio system 2 are integrated. Here the eyewear earpiece 3 forms the carrier element 4. Alternatively, however, the carrier element 4 can also be a separate component releasably mounted on the eyewear earpiece 3.

The audio system 2 comprises a plurality of speakers 5, 6, 7. Said speakers are implemented here as MEMS speakers. The speakers 5, 6, 7 each comprise one sound guide channel 8, 9, 10 each having one primary opening 11, 12, 13 at the end thereof facing away from the speaker 5, 6, 7. Each of the speakers 5, 6, 7 further comprises a cavity 14, 15, 16. The cavities 14, 15, 16 are each disposed on the side of the corresponding speaker 5, 6, 7 facing away from the primary opening 11, 12, 13. The cavities 14, 15, 16 of the speakers 5, 6, 7 each comprise one secondary opening 17, 18, 19. The secondary openings 17, 18, 19 are disposed on the carrier element 4 on a side of the carrier element 4 facing away from the respectively associated primary opening 11, 12, 13.

Figure 2:
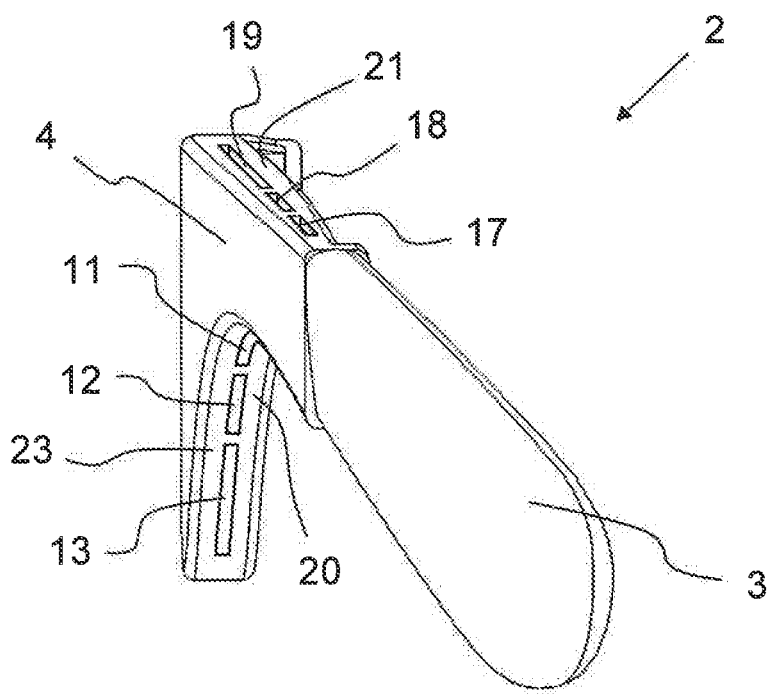

As implied by FIGS. 1 and 2, the primary openings 11, 12, 13 are disposed on a bottom side 20 of the carrier element 4 when the carrier element 4 and the eyewear earpiece 3 are disposed as intended. The secondary openings 17, 18, 19, in contrast, are positioned on an opposite top side 21 of the carrier element 4. The primary openings 11, 12, 13 and the corresponding secondary openings 17, 18, 19 are accordingly positioned facing away from each other and/or on different sides of the carrier element 4.

According to FIG. 1, the primary openings 11, 12, 13 are disposed on the bottom side 20 and/or aligned such that said openings are aligned toward an ear opening 22 of the user when the eyewear 1 is disposed as intended. The primary openings 11, 12, 13 further have substantially the same distance from the ear opening 22. To this end, the bottom side 20 of the carrier element 4 comprises a correspondingly curved outer surface 23. The outer surface 23 is concavely curved to this end, so that the height of the eyewear earpiece 3 increases in the direction toward the lenses 24. At least the foremost speaker 7 of the speaker array is thereby aligned rearward in the direction toward the ear opening 22.

The audio system 2 according to FIG. 1 further comprises a control unit 25. The control unit 25 is electrically connected to the speakers 5, 6, 7 and integrated in the carrier element 4 or eyewear earpiece 3 according to the present embodiment example. The control unit 25 is further implemented such that beam forming of the audio signals can be performed by means of the same. In this case the sound waves emitted by the speakers 5, 6, 7 are focused on the ear opening 22 of the user and/or the sound waves emitted into the surrounding area are reduced. It can thereby be advantageously ensured that the audio information emitted by the audio system 2 is made available exclusively to the wearer of the eyewear 1 and cannot be perceived by other persons present in the immediate vicinity.

Figure 3:
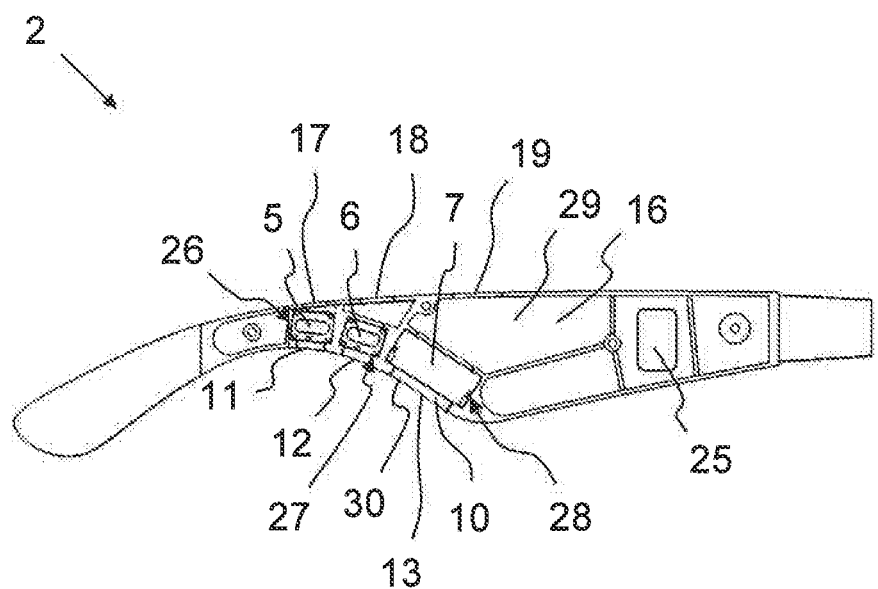

As implied from FIGS. 1 and 3, the audio system 2 according to the present embodiment example comprises three speakers 5, 6, 7. The first speaker 5 and the second speaker 6 are here implemented as treble speakers. The third speaker 7, in contrast, is implemented as a bass speaker. Said speaker 7 accordingly comprises a larger cavity 16 in comparison with the first and second speakers 5, 6. The two treble speakers 5, 6 are directly adjacent to each other according to FIG. 1. The bass speaker in said speaker array forms the foremost speaker 7. Alternatively, however, it is also conceivable that the bass speaker 7 be disposed between the two treble speakers 5, 6. The distance between the primary openings 11, 12 of the first and second speakers 5, 6 can thereby be increased.

FIG. 3 shows a longitudinal section through the carrier element 4 and the eyewear earpiece 3. It is thereby evident that the carrier element 4 comprises a plurality of hollow spaces 26, 27, 28 separated from each other by walls (cf. also FIG. 4.) The hollow spaces 26, 27, 28 are each associated with one of the speakers 5, 6, 7. The speakers 5, 6, 7 are disposed in the corresponding associated hollow space 26, 27, 28 according to FIG. 3 such that a first hollow space region 29 at least partially forms the cavity 16 of the associated speaker 7. The corresponding speaker 7 further separates the associated hollow space 28 such that a second hollow space region 30 is implemented. Said second hollow space region 30 forms the sound guide channel 10 of the corresponding speaker 7. For reasons of clarity, only one of said hollow spaces 26, 27, 28 has a corresponding reference numeral in FIG. 2.

Figure 4:
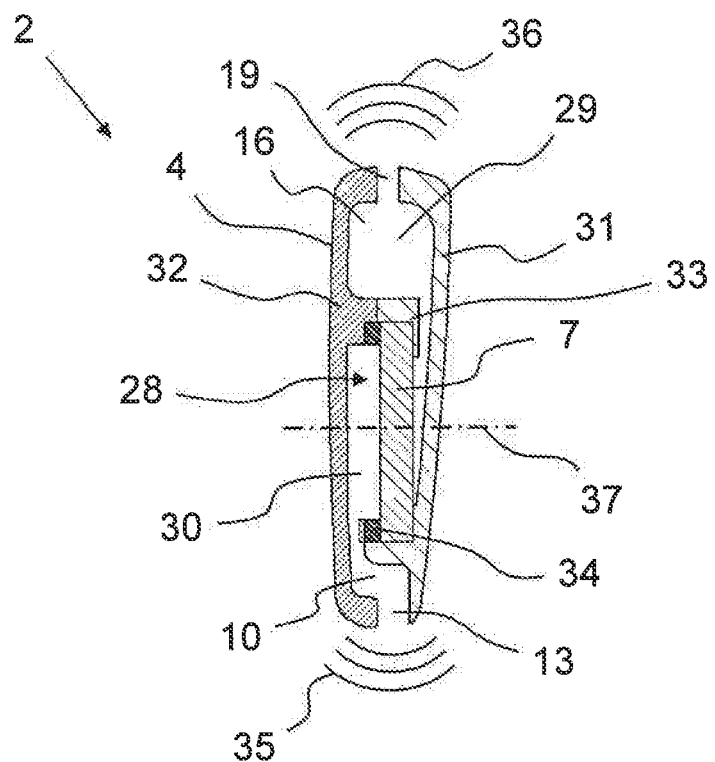

FIG. 4 shows a cross section through the carrier element 4 in the region of the third speaker 7. Said speaker is, as previously stated, implemented as a bass speaker. As implied by FIG. 4, the carrier element 4, or according to the present embodiment example the eyewear earpiece 3, comprises a first and a second housing part 31, 32. The two housing parts 31, 32 extend over the entire height of the eyewear earpiece 3. As a result, the primary opening 13 and the secondary opening 19 are each implemented between said two housing parts 31, 32. The two housing parts 31, 32 are preferably releasably joined to each other, so that damaged components of the audio system 2 can be replaced.

According to the present embodiment example, the speaker 7 is fully embedded in the first housing part 31. To this end, the first housing part 31 comprises a mounting recess 33 in which the edge region of the speaker 7 is positively held. The speaker 7 is thus disposed between the first and the second hollow space regions 29, 30 of the hollow space 28. As a result, the first hollow space region 29, as previously stated, forms the cavity 16 and the second hollow space region 30 forms the sound guide channel 10 of the speaker 7.

A sealing element 34 is further implemented in the hollow space 28. First sound waves 35 emitted by the speaker 7 into the second hollow space region 30 can thereby be prevented from penetrating into the first hollow space region 29. The second sound waves 36 emitted by the speaker 7 into the first hollow space region 29 can also be prevented from penetrating into the second hollow space region 30 by means of the sealing element 34. As a result, the hollow space regions 29, 30 are acoustically decoupled and/or sealed off from each other by means of the sealing element 34.

According to FIG. 4, the speaker 7 comprises a stroke axis 37 in the direction of which a membrane of the speaker 7, not shown in detail here, can be displaced. According to the present embodiment example, the speaker 7 is disposed in the eyewear earpiece 3 such that the stroke axis 37 thereof extends in the transverse direction of the eyewear earpiece 3. As a result, the primary opening 13 and the secondary opening 19 are aligned substantially at a 90° angle to the stroke axis 37 of the speaker 7.

As is evident particularly from FIG. 4, first sound waves 35 can be guided to the primary opening 13 through the sound guide channel 10 or second hollow space region 30 by correspondingly actuating the speaker 7. The first sound waves 35 exit the hollow space 28 of the carrier element 4 through the primary opening 13 and reach the ear opening 22 (cf. FIG. 1.)

Due to the secondary opening 19, the audio system 2 is also implemented such that second sound waves 36 can be emitted to the surrounding area. The second sound waves 36 produced by the speaker 7 accordingly reach the secondary opening 19 through the cavity 16 or the first hollow space region 29, where said waves 36 can exit the carrier element 4. In this case the control unit 25 actuates the speaker 7 such that the second sound waves 36 are phase-offset in comparison with the first sound waves 35, particularly by 180°. The portion of the first sound waves 35 emitted not toward the ear opening 22 but rather inadvertently into the surrounding area, is thereby eliminated by the second sound waves 36 emitted into the surrounding area, so that the first sound waves 35 are audible substantially exclusively in the region of the ear opening 22.

The secondary opening 19 is preferably substantially the same size as the associated primary opening 13. Alternatively, the secondary opening 19 is implemented smaller in size, wherein said opening is preferably not more than 5%, 10%, 20%, 25%, or 30% smaller than the primary opening 13.

The speakers 5, 6 implemented as treble speakers can be implemented in an identical manner according to the present embodiment example. Alternatively, however, it is also possible that the speakers 5, 6 implemented as treble speakers do not comprise any secondary opening 17, 18, but rather only the speaker 7 implemented as a bass speaker. In addition or alternatively, the control unit 25 can be implemented for acoustic beam shaping, such that the two speakers 5, 6 implemented as treble speakers can be actuated at a phase offset relative to each other. Said phase offset is defined by the control unit 25 as a function of the distance between said two speakers 5, 6 and in particular between the two primary openings 11, 12 thereof.

Auditory information (first sound waves 35) can thus be advantageously transmitted by means of the audio system 2 described above to the user without said information being able to be perceived by persons present nearby. The non-contacting implementation of the audio system 2, that is, spaced apart from the ear, and the associated high level of wearing comfort can also achieve a very high level of customer acceptance.

The present invention is not limited to the embodiment examples shown and described. Modifications in the context of the claims are also possible, as is a combination of features, even if shown and described in different embodiment examples.

REFERENCE LIST

1 Eyewear
2 Audio system
3 Eyewear earpiece
4 Carrier element
5 First speaker
6 Second speaker
7 Third speaker
8 First sound guide channel
9 Second sound guide channel
10 Third sound guide channel
11 First primary opening
12 Second primary opening
13 Third primary opening
14 First cavity
15 Second cavity
16 Third cavity
17 First secondary opening
18 Second secondary opening
19 Third secondary opening
20 Bottom side
21 Top side
22 Ear opening
23 Curved outer surface
24 Lenses
25 Control unit
26 First hollow space
27 Second hollow space
28 Third hollow space
29 First hollow space region
30 Second hollow space region
31 First part of the housing
32 Second part of the housing
33 Mounting recess
34 Sealing element
35 First sound waves
36 Second sound waves
37 Stroke axis

The invention claimed is:

1. An audio system for disposing in the external region of a user's ear defining an ear opening thereto, the audio system comprising:
a carrier element configured for being carried by the user's ear and defining a hollow space that includes a first region, wherein the hollow space defines a primary opening oriented in a first direction with respect to the carrier element;
a first speaker disposed in the hollow space and configured to emit first sound waves through the primary opening in the first direction;
wherein the first speaker defines a cavity,
wherein the first region of the hollow space includes a secondary opening oriented in a second direction away from the first direction with respect to the carrier element and configured for permitting the first speaker to emit secondary sound waves through the secondary opening, wherein the first speaker is configured to emit secondary sound waves that are offset in phase from the first sound waves so as to reduce the volume of the sound waves emitted by the audio system; and
wherein the first speaker is a MEMS speaker that includes a membrane displaceable along a stroke axis, wherein the primary opening and the secondary opening is aligned at an angle that is substantially at 90° to the stroke axis.

2. The audio system according to claim 1, wherein the primary opening and the secondary opening are disposed on two different sides and/or sides facing away from each other of the carrier element, wherein said primary and secondary openings are inclined at an angle of at least 90° and no greater than 180° to each other.

3. The audio system according to claim 1, wherein the audio system comprises a control unit for acoustic beam shaping, said control unit being electrically connected to the first speaker.

4. The audio system according to claim 3, wherein the control unit is implemented such that the first sound waves emitted by the first speaker through the primary opening can be focused along the first direction and the secondary sound waves comprise a phase offset of substantially 180° to the first sound waves.

5. The audio system according to claim 3, further comprising a microphone and wherein the control unit is implemented such that background noise captured by the microphone can be suppressed by correspondingly actuating the speaker.

6. The audio system according to claim 3, further comprising:
a second speaker that is a treble speaker spaced apart from the first speaker, which is a treble speaker, wherein the control unit is implemented for acoustic beam shaping, such that the two treble speakers can be actuated at a phase offset determined as a function of the spacing between the first and second speakers.

7. The audio system according to claim 3, wherein the control unit is integrated in the carrier element.

8. The audio system according to claim 1, wherein the first speaker comprises a sound guide channel leading to the primary opening and formed at least partially by a second hollow space region.

9. The audio system according to claim 1, wherein the carrier element comprises two housing parts joined to each other, wherein the hollow space is disposed between the two housing parts, and the first speaker is positively held in a mounting recess defined in one of the two housing parts.

10. The audio system according to claim 9, further comprising a sealing element formed as a frame that is pressed between the first speaker and one of the two housing parts.

11. The audio system according to claim 1, wherein the primary opening and the secondary opening are separated from each other by the first speaker disposed between the primary opening and the secondary opening.

12. An audio system for disposing in the external region of a user's ear defining an ear opening thereto, the audio system comprising:
a carrier element configured for being carried by the user's ear and defining a first hollow space that includes a first region and defines a first primary opening oriented in a first direction with respect to the carrier element, and wherein the carrier element defines a second hollow space that defines a second primary opening oriented in the first direction with respect to the carrier element;
a first speaker disposed in the first hollow space and configured to emit first sound waves through the first primary opening in the first direction;
wherein the first region of the first hollow space includes a secondary opening oriented in a second direction away from the first direction with respect to the carrier element and configured for permitting the first speaker to emit secondary sound waves through the secondary opening, wherein the first speaker is configured to emit secondary sound waves that are offset in phase from the first sound waves so as to reduce the volume of the sound waves emitted by the audio system; and
wherein the first speaker is a MEMS speaker that includes a membrane displaceable along a stroke axis, wherein the primary opening and the secondary opening are aligned at an angle that is substantially at 90° to the stroke axis; and
a second speaker disposed in the second hollow space and configured to emit second sound waves through the second primary opening in the first direction, wherein the respective first and second speakers are treble speakers, wherein the respective first and second primary openings thereof being disposed at a spacing from each other by between 1 and 5 cm, such that the two treble speakers can be actuated at a phase offset determined as a function of the spacing.

13. The audio system according to claim 12, wherein the carrier element defines a curved outer surface, and wherein the respective first and second primary openings of the respective first and second speakers are disposed on the curved outer surface of the carrier element.

14. The audio system according to claim 12, wherein the carrier element is integrated in an eyewear earpiece having a bottom side and a top side disposed spaced apart from the bottom side, wherein the respective first and second primary openings of the speakers are disposed in the region of the bottom side and the respective first and second secondary openings are disposed in the region of the top side of the eyewear earpiece.

15. The audio system according to claim 12, further comprising a sealing element disposed between the first hollow space and the second hollow space so as to seal off the first hollow space from the second hollow space.

16. The audio system according to claim 12, further comprising a control unit electrically connected to each of the two treble speakers, wherein the control unit is configured for actuating the two treble speakers at a phase offset that is determined as a function of the spacing between the primary openings of the two treble speakers.

17. Eyewear for being worn on a person's head, which includes an ear defining an ear opening, and for inputting and outputting visual and/or auditory information, the eyewear comprising:
a body configured for being worn on the person's head; and
an audio system that includes:
a carrier element integrated with the body and configured for being carried by the person's ear and defining a hollow space that includes a first region, wherein the hollow space defines a primary opening oriented in a first direction with respect to the carrier element;
a MEMS speaker disposed in the hollow space and configured to emit first sound waves through the primary opening in the first direction and away from the primary opening;
wherein the MEMS speaker defines a cavity;
wherein the first region of the hollow space includes a secondary opening oriented in a second direction with respect to the carrier element and away from the first direction and configured to permit the MEMS speaker to emit secondary sound waves through the secondary opening that are offset in phase from the first sound waves so as to reduce the volume of the sound waves that the audio system emits from the MEMS speaker.

* * * * *